Patented Nov. 8, 1938

2,136,313

UNITED STATES PATENT OFFICE 2,136,313

COATING COMPOSITION

Gordon Derby Patterson, Wilmington, Del., assignor to E. I. du Pont de Nemours & Company, Wilmington, Del., a corporation of Delaware No Drawing. Application August 4, 1936, Serial No. 94,287

6 Claims. (Cl. 134—58)

This invention relates to coating compositions and more particularly to pigments treated with certain agents referred to herein as dispersion control agents.

This invention has as its object the control of pigment dispersion in coating compositions. A further object is the improvement of coating composition properties through modifying pigment dispersion. A further object is the treatment of pigments with such agents and through this modification improving the utility of the pigments in coating compositions. A further object is the production of new and useful compositions of matter. Other objects will appear hereinafter.

These objects are accomplished by the treatment of pigments in the manner hereinafter described with acid esters formed from polycarboxylic organic acids and an organic compound containing an esterifiable hydroxyl group, preferably a long chain alcohol, and with the salts of such acid esters.

I am aware that compounds of the kind mentioned above have been used in coating compositions having a cellulose derivative vehicle as a plasticizing agent for the nitrocellulose or other cellulosic material. I have discovered that acid esters and their salts produce useful results when used in much smaller percentages than are required to produce a plasticizing effect. The amount which I have found useful in the control of dispersion is in the neighborhood of that necessary to saturate the adsorptive capacity of the surface of the pigment particles. Any substantial excess beyond this amount is of no practical value, and actually may be injurious. The amount of the agent required is therefore much smaller than would be required to plasticize nitrocellulose or other cellulose esters or ethers; furthermore the dispersion control agent, being substantially adsorbed on the pigment surface, is not free to exert any significant plasticizing effect. This invention is also chiefly concerned with the control of pigment dispersion in coating compositions having oil-type vehicles and in obtaining durable, non-tacky, water-resistant films. The possibility of controlling pigment dispersion and the production of satisfactory pigmented films through the use of the agents disclosed herein has not heretofore been recognized. The relatively large proportions of agent to pigment that must be used when the agent is incorporated into a nitrocellulose composition as a plasticizing agent are not practical when used in oil-type vehicle systems as the resulting films are too sticky, soft, have poor water-resistance and in certain cases initial luster may be impaired.

The term "dispersion control agent" as used herein designates an agent which when added to a pigmented coating composition or when applied as a treating agent to a pigment serves to alter the state of dispersion (flocculation or deflocculation) of the pigment in the vehicle system and has reference to an amount of agent sufficient to form and maintain a coating on the pigment particles either by adsorption or deposition. The use of the term in this manner thereby defines the "dispersion control agent" in terms of its true function, as any amount substantially beyond these requirements are unnecessary and may be detrimental. The term "dispersing agent" as commonly used is limited to a deflocculating agent whereas the term "dispersion control agent" covers a material which may be either a deflocculating or a flocculating agent. In order to give a better picture of the concept, a description of general uses and applications is given in the following paragraphs.

A. Properties of a coating composition which are controlled or influenced by a pigment flocculating agent.

1. Prevention of hard caking of a pigment. Many pigments when ground in a coating composition vehicle which has marked deflocculating characteristics become very well dispersed. If such a composition is examined under the microscope the pigment particles appear as individuals and there is no evidence of the existence of pigment flocculates and if pigment particle size is small there may be considerable Brownian movement. If such a coating composition is allowed to stand for some time, such as encountered in the normal storage of a product in the can prior to use, a certain amount of settling of the pigment will take place, the amount of course depending on the time, temperature, viscosity of the vehicle and specific gravity of the pigment. Because of the deflocculated character of the pigment, the settled cake usually will be very hard and close packed and reincorporation of the pigment in the vehicle will be very difficult. This hard caking in many cases is quite serious as the pigment cake may become so hard that satisfactory reincorporation of the pigment in the vehicle is practically impossible except by regrinding. If, however, a "dispersion control agent" possessing a flocculating effect on the pigment is added to the pigment or vehicle, the severe caking can be prevented. The amount of agent used is adjusted so that only sufficient flocculation is obtained to cause a soft pigment settlement but which is insufficient to significantly alter other properties. In other words, pigment flocculation is controlled thereby preventing hard caking of the pigment.

2. Control of consistency of a paint can also be accomplished by inducing the proper amount of pigment flocculation. In many systems it is undesirable and often impossible to change the composition so as to obtain the consistency necessary for proper brushing, film build and to prevent sagging. The increase of consistency with improvement of brushing is particularly important in flat wall paints which are highly pigmented and are usually applied in a fairly heavy coat. Furthermore, controlled flocculation in a coating of this type can be advantageously used to increase hiding power. In such products considerable hiding power is produced by surface irregularities which give great scattering and diffusion of light at the film surface. This irregularity is very slight as the surface is irregular with respect to the wave length of light so that it is not visible except as indicated by increased hiding. The difference can be revealed, however, by proper microscopic examinations of the film.

3. Controlled flocculation of pigment constituents is also a means of preventing flooding. In certain types of coating compositions pigmented with two pigments of different colors such as a chrome green (chrome yellow plus iron blue) flooding is often quite a serious difficulty. It is often due to a difference in the dispersion of the two pigment components causing the dispersed material to be carried to the surface of the drying film by the movement of the vehicle during evaporation of solvent and in drying, giving an irregular color at the film surface. By controlling pigment dispersion, separation of the two components is prevented during drying of the film and flooding is largely eliminated. Flooding is also a factor in tints where only a small amount of coloring material is used to produce the desired shade of a coating material.

B. Properties of a coating composition which are influenced by a pigment deflocculating agent.

By describing the results which can be obtained by the use of agents which are opposite in their effects, it may appear that the statements are in a sense contradictory but it should be realized that each pigment vehicle system presents a different problem and it is often necessary to compromise to some extent to obtain improvement in certain properties without too great a sacrifice in others, but which permits the production of a product which most nearly approaches the ideal for the particular pigment-vehicle system. In the discussion under (A) various properties have been indicated which are improved by controlled flocculation, likewise various properties can be improved by the use of an agent which causes pigment deflocculation.

1. *Gloss.*—In coating materials in which gloss is important, such as enamels, the gloss can be improved by use of an agent which functions as a deflocculating agent.

2. The hiding power of a pigment in glossy surface coating compositions can be materially increased by the use of a deflocculating agent or one which prevents flocculation. By eliminating or preventing flocculation, the maximum hiding value from each pigment particle can be obtained thereby increasing the covering power of the coating composition. It should be noted that a distinction is made between glossy and matte surface coatings. (See discussion under A—2.)

3. Improved flow and leveling can be obtained by the use of pigment deflocculating agent.

4. In certain types of colored finishes the color which is obtained is appreciably altered by the extent of pigment flocculation in the film. In order to match such products accurately the pigment dispersion in each successive batch of material must be the same. By use of a "dispersion control agent" the state of pigment dispersion can be kept uniform thereby improving initial color and permitting accurate color matching.

5. *Improved drying.*—Certain pigments because of a very severe flocculating tendency may trap vehicle within the flocculated mass causing slow drying and a rather soft spongy film. By deflocculation of the pigment, at least to a certain extent, the drying characteristics and film hardness can be improved.

The dispersion control agents, as previously indicated, function in the coating composition through adsorption on the pigment surfaces. Thus the adsorbed agent may serve to cause pigment flocculation in some vehicle systems and pigment dispersion in others. The application of the agent to the pigment prior to its incorporation in the vehicle has certain advantages such as improved wetting and ease of incorporation of the pigment in the vehicle system. It should be noted that ease of wetting must not be confused with pigment dispersion inasmuch as ease of wetting can be improved whether the pigment is dispersed or flocculated in the vehicle system. Furthermore, in some cases the agents are much more effective and can be used in smaller quantity when applied directly to the pigment than when added to thinner or vehicle constituents of the coating composition. The agents, however, can be added to the thinner or vehicle and such additions are pigment treatments in that the effectiveness of the dispersion control agent is due to its adsorption by the pigment. In some instances the agent or a solution of the agent may be added to the finished coating composition. This method of treatment, however, is not as effective as the other methods described herein.

The preferred method of practicing the invention usually consists in treating the pigment with a dispersion, that is a solution or suspension, of the agent in a volatile liquid. Thus I may add the dispersing agent to a water slurry of the pigment, or the agent may be adsorbed on the pigment by adding the pigment to a solution of the agent in an organic solvent. Another method consists in adding a water soluble salt of the agent to a water slurry of the pigment followed by precipitation of the agent on the pigment. Instead of precipitating an insoluble salt by the addition of a suitable water soluble metal salt, the free acid ester in some instances can be regenerated by the addition of a mineral acid.

From the various methods of practicing the invention described above it will be apparent that my improved compositions of pigment treated with the dispersion control agent include also coating compositions containing the treated pigment.

In order to accomplish the objects of this invention it is important that the ratio of the agent to pigment be kept low. In most instances the amount by weight of the agent is from 0.5% to 5% by weight of the pigment, and this represents the most generally useful range, but amounts of the agent as low as 0.25% of the pigment are often sufficient, particularly in the case of high density, large particle size pigments. When the proportion of agent to pigment rises substantially above 10% the films laid down from coating compositions containing the treated pigment are generally adversely affected in the properties of gloss, water sensitivity, and freedom from tackiness.

The particular proportion of agent to use in any one case generally depends largely upon the nature of the pigment used. Thus, with pigments having a specific gravity below 2.5 such as carbon black, the iron blues, Para reds, toluidine reds, organic yellows, ultramarine blue, etc., as much as 10% of the agent, based on the weight of the pigment, may be required to obtain the desired results, while with pigments having specific gravities above 2.5 such as lithopone, zinc sulfide, zinc oxide, titanium oxide, barium sulfate extended titanium oxide, calcium sulfate extended titanium oxide, titanates, white lead, iron oxide, chrome yellows, etc., the most useful range in the amount of treating agent is from 0.5% to 2.5%. The treatment may also be advantageously applied to extenders such as calcium sulfate, barium sulfate, calcium carbonate, talc, mica, silica, silicates, etc.

The most effective of the acid esters used in the practice of this invention are the acid esters of polycarboxylic acids with long chain aliphatic monohydric alcohols in which the alcohol has at least 8 carbon atoms and preferably from 10 to 22 carbon atoms. Typical examples of such alcohols are decyl, undecyl, tetradecyl, monadecyl, cetyl, oleyl, ricinoleyl, eicosyl, undecenyl, etc. Alpihatic monohydric alcohols having a lesser number of carbon atoms often do not yield acid esters having the proper affinity or compatibility with the vehicle. Particularly desirable are the acid esters derived from the mixed long chain aliphatic monohydric alcohols obtained by carboxyl hydrogenation of coconut oil acids, palm kernel oil acids, fish oil acids, and in general of vegetable and animal oils and fats, and the acids derived therefrom.

The following examples are illustrative of methods which can be used for carrying out my invention:

Example I

Five hundred parts $TiO_2$—$BaSO_4$ pigment was mixed with sufficient water to form a slurry which could be readily agitated. Five parts dodecyl acid phthalate was dissolved in alcohol and the alcohol solution slowly added to the vigorously agitated pigment slurry. The dodecyl acid phthalate separated in a finely divided form and was taken up by the pigment. The pigment slurry was then filtered and the pigment dried after which it was pulverized and was ready for use.

Other water soluble solvents can also be used and the treatment carried out in the same manner. Furthermore, the agent can be dissolved in a suitable volatile solvent, the pigment added to the solution forming a paste which can be dried thus depositing the agent on the pigment.

The above pigment was evaluated in a bodied linseed-China-wood oil vehicle system and found to be very resistant to hard caking. The untreated pigment cakes very severely in this vehicle system forming a very hard layer of seemingly dry pigment which is very difficult to reincorporate in the vehicle. The treated pigments, however, settle to a soft cake which can be readily stirred into the vehicle. The presence of the agent induces a flocculation of the pigment preventing the development of a hard cake. The amount of flocculation can be controlled by varying the amount of agent, a very small amount being usually sufficient to induce the very mild flocculation necessary to prevent the objectionable hard caking of the pigment.

Example II

A slurry of chrome green was prepared by mixing 106 parts of iron blue slurry containing 4 parts of blue pigment with 122 parts of chrome yellow slurry containing 16 parts of yellow pigment. To this slurry was added 30 parts of a water solution of the agent said solution having been prepared by diluting a solution of one part of octadecyl acid phthalate in 2.5 parts of an ammonium hydroxide solution containing 5% $NH_3$ with sufficient water to make a total of 30 parts. After thorough stirring to incorporate the agent, the slurry was filtered and the pigment dried. The free acid ester is partially regenerated by hydrolysis during dilution, and ammonia is finally driven off during drying.

Cellulose acid phthalate, fenchyl acid phthalate, benzyl acid phthalate, castor oil acid phthalate, and sucrose acid phthalate may be substituted for the dodecyl acid phthalate of Example I or the octadecyl acid phthalate of Example II with analogous results. If desired, the agent may be precipitated directly on the pigment by adding a soluble heavy metal salt to the pigment slurry containing the ammonium salt of the acid ester.

These agents are particularly useful in preventing or modifying the flooding characteristics of the chrome green pigment of Example II.

Example III

The alcohols used in this example were the mixture of alcohols obtained by carboxyl hydrogenation of sperm whale oil acids. This mixture contains alcohols having a chain length of 12 to 22 carbon atoms but is composed principally of unsaturated alcohols of chain length from 16 to 18 carbon atoms.

Four parts of the acid phthalate of the above mixture of alcohols was dispersed in a dilute ammonium hydroxide solution and added with agitation to 200 parts of calcium carbonate slurried in 1000 parts of water. The slurry was then filtered and the treated $CaCO_3$ dried and pulverized.

The improved flow of a pigmented system obtained by the use of the treated calcium carbonate is illustrated by the following test. Treated and untreated samples of $CaCO_3$ were ground in a bodied linseed-China-wood oil vehicle and diluted with the same volume of mineral spirits. The same amount of each of the two systems was then placed on a clean glass plate and allowed to flow out. The flow-out area of the product containing the treated calcium carbonate was 1.5 times that of the system containing the untreated control. This test is illustrative of a pigmented system in which the agent functions as a pigment deflocculating agent.

Example IV

Five parts of the acid phthalate of the mixture of alcohols obtained by carboxyl hydrogenation of coconut oil acids was dissolved or dispersed by heating with 75 parts by weight of 1% sodium hydroxide solution. This solution was then added slowly with vigorous stirring to 500 parts of titanium oxide slurried in 1500 parts of water containing 3 parts of cadmium chloride. The alcohols used in this example contained from 50% to 70% saturated 12 carbon atom (dodecyl) and 30% to 50% saturated 14 carbon atom (tetradecyl) alcohols plus varying amounts of alcohols of shorter and longer chain lengths.

The above procedure may also be used to precipitate salts of zinc, and barium, and other colorless salts directly on the pigment particles.

*Example V*

One hundred parts of $TiO_2$ were slurried in 400 parts of water with vigorous agitation.

One part of dodecyl acid succinate was dissolved in a dilute $NH_4OH$ solution and added slowly to the above slurry with strong stirring.

The slurry was then treated with dilute hydrochloric acid (HCl) to regenerate the acid ester. The slurry was then filtered and the pigment washed after which it was dried and pulverized, and was then ready for use.

*Example VI*

One hundred parts of $TiO_2$ were mixed with 400 parts of water by thorough agitation.

One part of dodecyl acid citrate was dissolved in the minimum amount of acetone and the solution slowly added to the pigment slurry with vigorous stirring. As the acetone solution was diluted during the addition to the water slurry, the agent separated in a finely divided form and was distributed with and on the pigment particles. The slurry was then filtered, the pigment washed and then dried.

I have formulated coating compositions containing 1% on the basis of the pigment of the agents described in Examples III and IV with the following vehicles: oil modified polyhydric alcohol-polycarboxylic acid resin, bodied linseed-China-wood oil, long oil linseed-limed rosin varnish, linseed oil and rosin.

The pigments used in these compositions were: titanium oxide-barium sulfate, titanium oxide, carbon black, and Para Red toner. The pigment content in the case of the compositions containing the titanium oxide-barium sulfate pigment and the titanium oxide pigment was 30% by volume based on total solids. In the case of the Para Red toner 22 parts were used for 100 parts of solid resin, and in the case of the carbon black composition 6 parts per 100 parts of solid resin were used.

Each of the large number of pigmented compositions mentioned above containing the dispersion control agent showed improved resistance to hard caking in the case of the agents which have a flocculating effect on the pigment, and of improved flow and gloss in the case of the agents which have a deflocculating effect on the pigment.

The 1% of agent used in the above experiments does not necessarily represent the optimum, as this will vary with the nature of the vehicle and pigment being treated and with the magnitude of the effect desired. Where only slight effects are produced by 1% of the agent the amount of agent may be increased several fold in order to obtain the desired results. This is particularly true in the case of the reds and blacks which are normally formulated at much lower pigment concentrations than the white or extended white pigments. Because of this variation it is necessary to select the suitable agent and the optimum amount for each particular vehicle and pigment system.

In the practice of this invention I may also use acid esters and salts of acid esters of polycarboxylic acids and organic compounds containing esterifiable alcoholic hydroxyl groups, such as polyhydric alcohols, e. g., ethylene glycol, glycerol, sorbitol, etc.; hydroxylated oils and hydrogenated hydroxylated oils, e. g., castor oil and hydrogenated castor oil, etc.; polyhydric alcohols partially acylated with oil fatty acids, e. g., linseed and China-wood oil acids, resinic acids, e. g., abietic acid and hydrogenated abietic acid, etc.; fatty acids, e. g., lauric, oleic, stearic, etc.; naphthenyl alcohols obtained by carboxyl hydrogenation of naphthenic acids; abietyl and hydroabietyl alcohols, etc.; hydroaromatic alcohols, e. g., benzyl alcohol, etc. The polycarboxylic acids from which the esters are formed may include such acids as fumaric, maleic, adipic, citric, succinic, malic, itaconic, glutaric, tricarballylic, tartaric, azelaic, sebacic, suberic, naphthalenetetracarboxylic naphthalic, etc.

It will be apparent from the foregoing description that I have developed an economical and effective method for controlling pigment dispersion in coating compositions and for producing coating compositions which yield films having improved hardness, gloss, and water resistance.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a pigment having deposited thereon a dispersion control agent selected from the class consisting of acid esters of polycarboxylic acids with aliphatic monohydric alcohols having at least 8 carbon atoms, and salts of such esters, the sole salt-forming group in said esters being the carboxyl group.

2. A composition of matter comprising a pigment having deposited thereon a dispersion control agent comprising an acid ester of a polycarboxylic acid with an aliphatic monohydric alcohol having from 10 to 22 carbon atoms, the sole salt-forming group in said ester being the carboxyl group.

3. A composition of matter comprising a pigment having deposited thereon a dispersion control agent selected from the class consisting of acid esters of polycarboxylic acids with aliphatic monohydric alcohols having at least 8 carbon atoms, and salts of such esters, the sole salt-forming group in said esters being the carboxyl group, said agent being present in said composition in an amount not more than 10% by weight of the pigment.

4. A composition of matter comprising a pigment having deposited thereon a dispersion control agent comprising a salt of an acid ester of polycarboxylic acid in which the sole salt-forming group is the carboxyl group with aliphatic monohydric alcohol having from 10 to 22 carbon atoms.

5. A composition of matter comprising a pigment having deposited thereon a dispersion control agent comprising an acid ester of phthalic acid with an aliphatic monohydric alcohol having at least 8 carbon atoms, the sole salt-forming group in said ester being the carboxyl group.

6. A composition of matter comprising a pigment having deposited thereon a dispersion control agent comprising a salt of an acid ester of phthalic acid in which the sole salt-forming group is the carboxyl group with an aliphatic monohydric alcohol having at least 8 carbon atoms.

GORDON DERBY PATTERSON.